US012331716B2

(12) United States Patent
Pawar et al.

(10) Patent No.: US 12,331,716 B2
(45) Date of Patent: Jun. 17, 2025

(54) HUB ASSEMBLY FOR A WIND TURBINE HAVING A SPACER

(71) Applicant: General Electric Renovables Espana, S.L., Barcelona (ES)

(72) Inventors: Hemant Bhimrao Pawar, Bengaluru (IN); Bradley Graham Moore, Greenville, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/619,791

(22) Filed: Mar. 28, 2024

(65) Prior Publication Data

US 2024/0328384 A1  Oct. 3, 2024

(30) Foreign Application Priority Data

Mar. 30, 2023  (IN) .............................. 202311023706

(51) Int. Cl.
 *F03D 1/06*  (2006.01)
(52) U.S. Cl.
 CPC ...... *F03D 1/0691* (2013.01); *F05B 2260/301* (2013.01); *F05B 2280/1071* (2013.01); *F05B 2280/5007* (2013.01)
(58) Field of Classification Search
 CPC .... F03D 1/0691; F03D 80/504; F03D 17/031; F05B 2260/301
 See application file for complete search history.

(56) References Cited

U.S. PATENT DOCUMENTS

| | | | |
|---|---|---|---|
| 2,879,092 A * | 3/1959 | Grobel | E21B 10/60 |
| | | | 403/337 |
| 8,167,575 B2 * | 5/2012 | Eusterbarkey | F16D 1/033 |
| | | | 416/248 |
| 9,909,561 B2 * | 3/2018 | Gil Mollà | F03D 1/0658 |
| 11,795,917 B2 * | 10/2023 | Pawar | F03D 80/00 |
| 2013/0011253 A1 * | 1/2013 | Mulcaire | F01D 25/265 |
| | | | 415/214.1 |
| 2013/0186104 A1 | 7/2013 | Schnetgoke | |
| 2021/0215184 A1 * | 7/2021 | Moore | H02K 7/1838 |

FOREIGN PATENT DOCUMENTS

CN   204 299 802 U   4/2015
EP     4 102 065 A1  12/2022

OTHER PUBLICATIONS

EPO Search Report, Aug. 19, 2024.

* cited by examiner

*Primary Examiner* — Justin D Seabe
(74) *Attorney, Agent, or Firm* — Dority & Manning, P.A.

(57) ABSTRACT

A hub assembly for a wind turbine includes a hub having a surface defining a first set of bolt holes and a shaft having a flange having a second set of bolt holes. The first set of bolt holes is aligned with the second set of bolt holes at a hub-shaft interface. The hub assembly also includes a plurality of hub bolts extending through the first and second sets of bolt holes at the hub-shaft interface, a plurality of washers with one of the plurality of washers extending around each of the plurality of hub bolts, and at least one spacer positioned between the surface of the hub and a subset of the plurality of washers. At least two of the plurality of hub bolts extend through the at least one spacer.

20 Claims, 7 Drawing Sheets

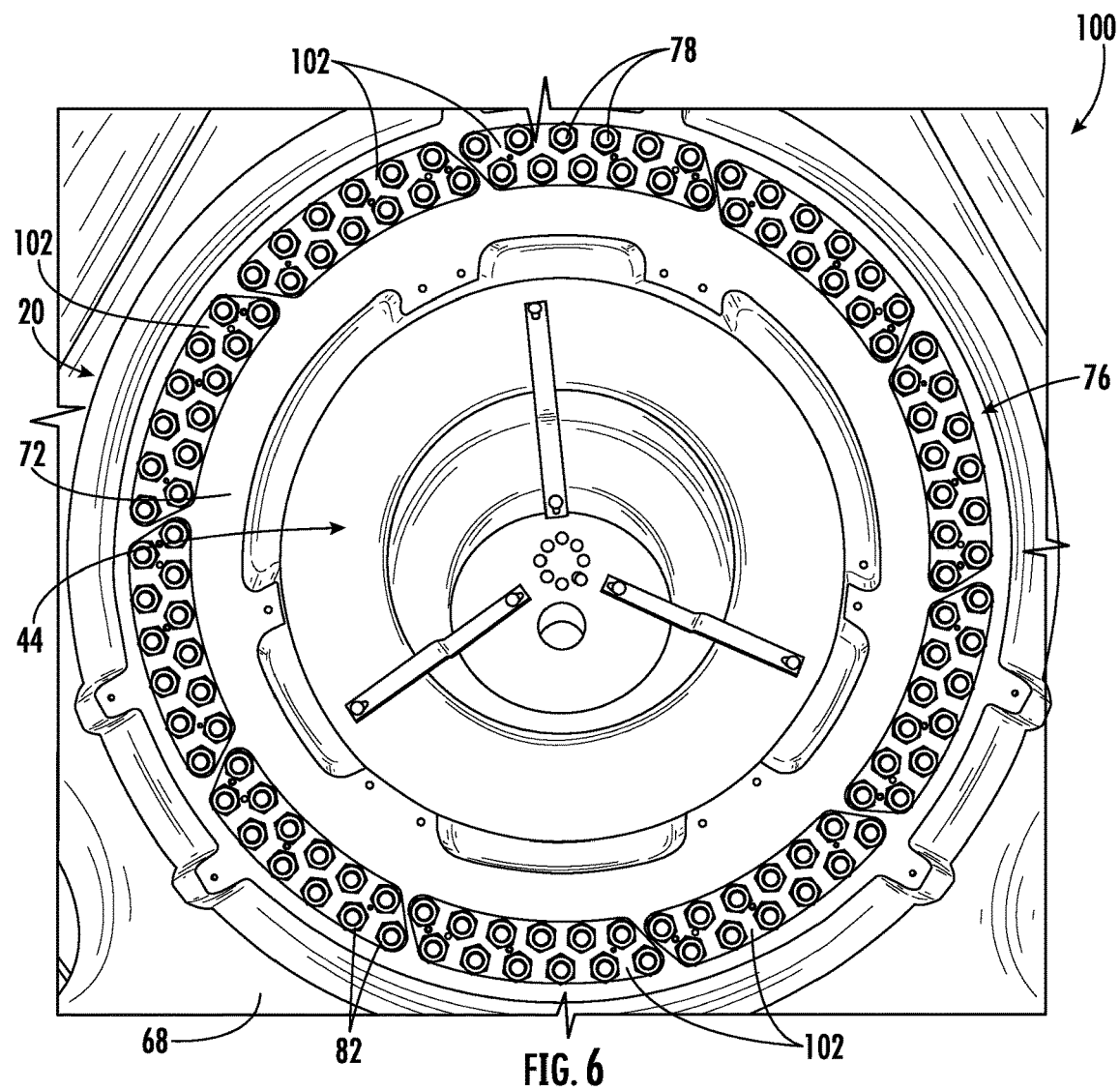
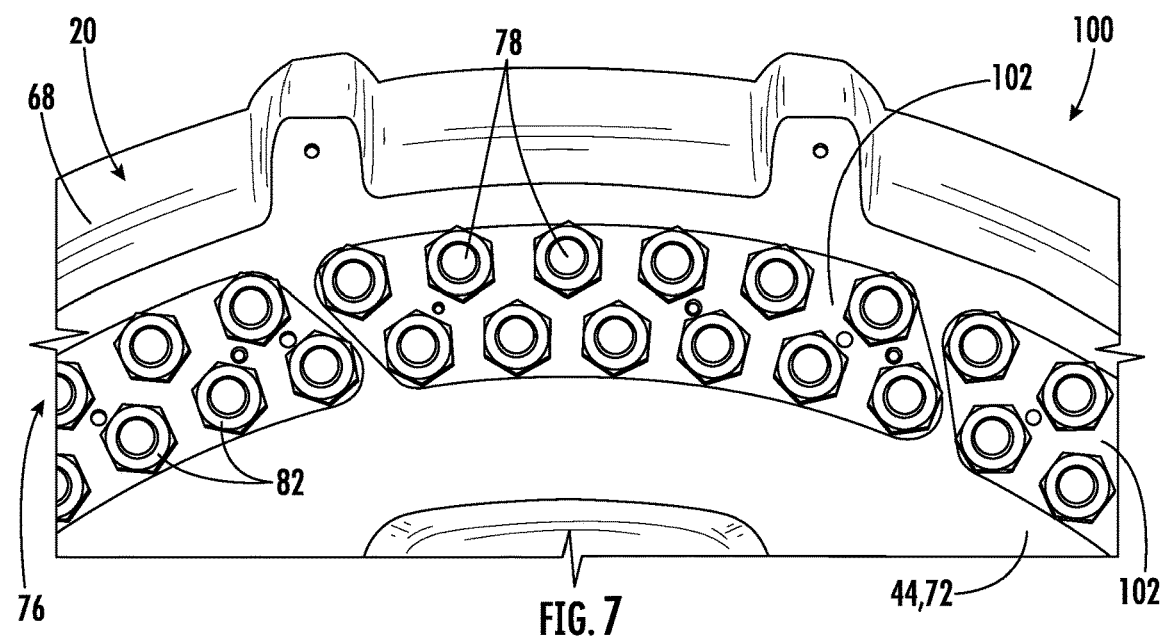

HUB ASSEMBLY FOR A WIND TURBINE HAVING A SPACER

FIELD

The present disclosure relates generally to wind turbines, and more particular to hub assemblies for wind turbines having a hub with one or more spacers arranged between the hub and a plurality of washers to reduce pressure under the washers so as to avoid washer embedment.

BACKGROUND

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, the generator, the gearbox and other components are typically mounted within a housing, or nacelle, that is positioned on top of a base that may be a truss or tubular tower.

The development of wind turbines constantly aims for higher power outputs, which leads to increasing size of the installations. Accordingly, it is a general objective to increase both the energy conversion at a given rotor size and to increase the rotor size itself, which leads to a higher average power output. However, increasing rotor size also means a general increase in machinery and nacelle size, which leads to higher total masses, and also to an increasing mass of the rotor blades and the hub.

Accordingly, increasingly heavy components can result in increased stress on the components as larger wind turbine sizes also mean greater dynamic loading and consequently require measures to account for the higher loads. An example measure to meet these requirements is to adapt the dimensions of parts, for instance the hub. Consequently, as the hub increases in size and weight, so do the stresses acting on the hub as well as the corresponding components associated therewith. In particular, the hub is typically mounted to the rotor shaft at a hub-shaft interface via a plurality of hub bolts having corresponding nuts and washers. During increased loads and/or high contact pressure, however, the hub-shaft interface can experience loosening of the hub bolts. An example cause of such hub bolt loosening may be due to the washer(s) becoming embedded into the hub, which is referred to as washer embedment. Such embedment can cause the washers to be embedded within the hub until, e.g., by as much as 2 millimeters (mm) deep or more.

Accordingly, a hub assembly for a wind turbine having a hub with one or more spacers arranged between the washers and the hub to reduce pressure under the washers so as to avoid washer embedment would be welcomed in the art.

BRIEF DESCRIPTION

Aspects and advantages of the invention will be set forth in part in the following description, or may be obvious from the description, or may be learned through practice of the invention.

In an aspect, the present disclosure is directed to a hub assembly for a wind turbine. The hub assembly includes a hub having a surface defining a first set of bolt holes and a shaft having a flange having a second set of bolt holes. The first set of bolt holes is aligned with the second set of bolt holes at a hub-shaft interface. The hub assembly also includes a plurality of hub bolts extending through the first and second sets of bolt holes at the hub-shaft interface, a plurality of washers with one of the plurality of washers extending around each of the plurality of hub bolts, and at least one spacer positioned between the surface of the hub and a subset of the plurality of washers. At least two of the plurality of hub bolts extend through the spacer(s).

In another aspect, the present disclosure is directed to a method of assembling a hub assembly of a wind turbine. The method includes aligning a first set of bolt holes on a surface of a hub of the wind turbine with a second set of bolt holes on a flange of a shaft of the wind turbine at a hub-shaft interface; placing one of a plurality of washers around each of a plurality of hub bolts; placing at least one spacer around a subset of the plurality of hub bolts adjacent to a subset of the plurality of washers; and inserting a plurality of hub bolts through the aligned first and second sets of bolt holes at the hub-shaft interface, wherein at least two of the plurality of hub bolts extend through the at least one spacer, and wherein the at least one spacer abuts against the surface of the hub.

In yet another aspect, the present disclosure is directed to a wind turbine. The wind turbine includes a tower, a nacelle mounted atop the tower, and a rotor mounted to the nacelle. The rotor includes a hub assembly having at least one rotor blade mounted thereto. The hub assembly includes a hub having a surface defining a first set of bolt holes and a shaft having a flange having a second set of bolt holes. The first set of bolt holes is aligned with the second set of bolt holes at a hub-shaft interface. The hub assembly also includes a plurality of hub bolts extending through the first and second sets of bolt holes at the hub-shaft interface, a plurality of washers with one of the plurality of washers extending around each of the plurality of hub bolts, and at least one spacer positioned between the surface of the hub and a subset of the plurality of washers. At least two of the plurality of hub bolts extend through the spacer(s).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates an embodiment of a front view of a hub assembly according to the present disclosure, particularly illustrating a hub-shaft interface as viewed from outside of the hub;

FIG. 7 illustrates a detailed, partial view of the hub assembly of FIG. 6.

DETAILED DESCRIPTION

Figure 1:
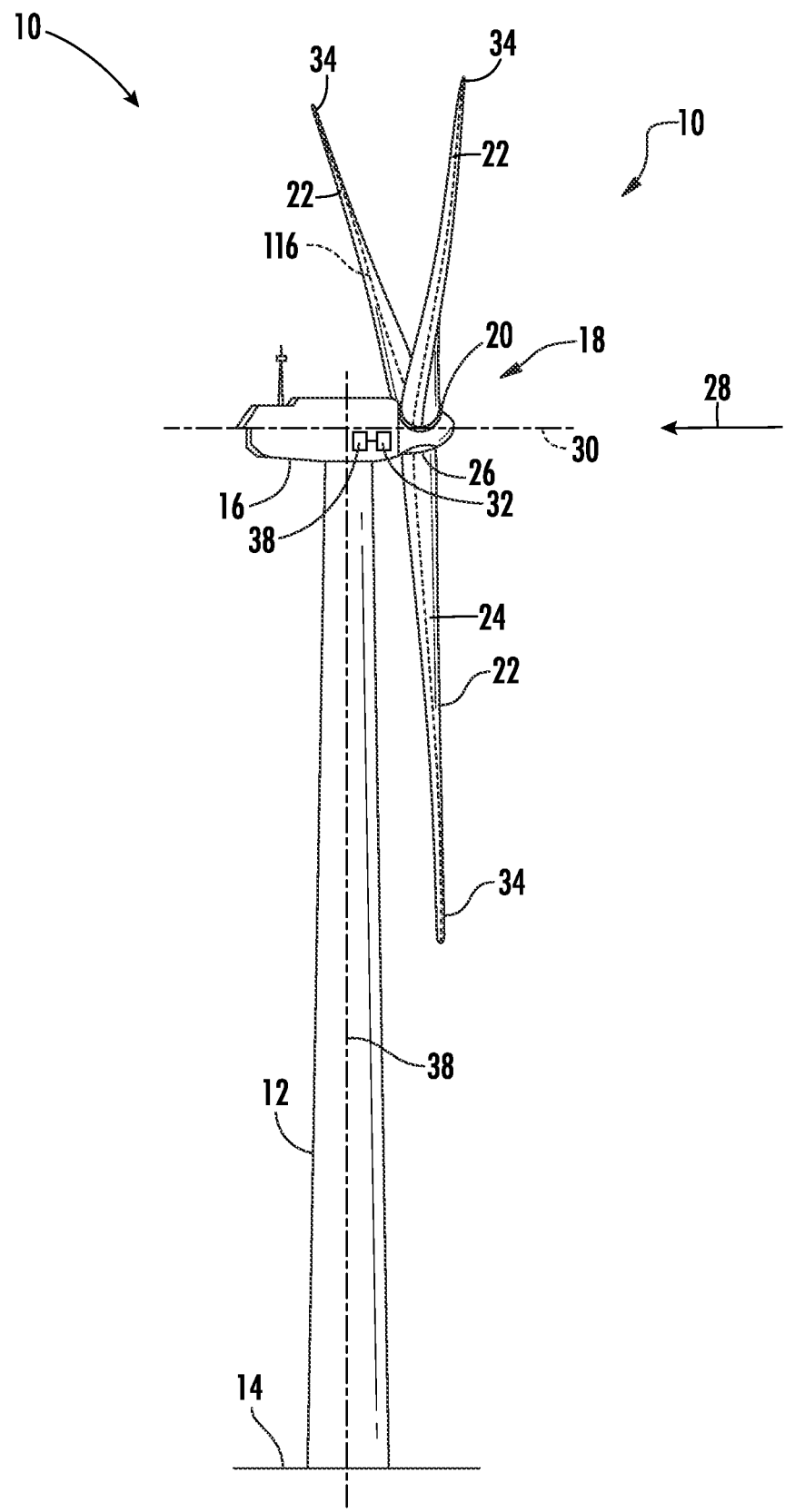
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 22 coupled to and extending outward from hub 20. In the exemplary embodiment, the rotor 18 has three rotor blades 22. In an alternative embodiment, the rotor 18 includes more or less than three rotor blades 22. In the exemplary embodiment, the tower 12 is fabricated from tubular steel to define a cavity (not shown in FIG. 1) between the support system 14 and the nacelle 16. In an alternative embodiment, the tower 12 is any suitable type of tower having any suitable height.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 have a hub load transfer region and a blade load transfer region (both not shown in FIG. 1). Loads induced to the rotor blades 22 are transferred to the hub 20 via the load transfer regions 26.

As wind strikes the rotor blades 22 from a direction 28, the rotor 18 is rotated about an axis of rotation 30. Moreover, a pitch angle or blade pitch of the rotor blades 22, i.e., an angle that determines a perspective of the rotor blades 22 with respect to the direction 28 of the wind, may be changed by a pitch adjustment system 32 to control the load and power generated by wind turbine 10 by adjusting an angular position of at least one rotor blade 22 relative to wind vectors. The pitch axes 34 for the rotor blades 22 are shown. During operation of wind turbine 10, the pitch adjustment system 32 may change a blade pitch of the rotor blades 22 such that the rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In an embodiment, a blade pitch of each rotor blade 22 is controlled individually by a controller 36. Alternatively, the blade pitch for all rotor blades 22 may be controlled simultaneously by controller 36. Further, in the exemplary embodiment, as direction 28 changes, a yaw direction of the nacelle 16 may be controlled about a yaw axis 38 to position rotor blades 22 with respect to direction 28. In an embodiment, the controller 36 is shown as being centralized within the nacelle 16, however, the controller 36 may be a distributed system throughout wind turbine 10, on support system 14, within a wind farm, and/or at a remote-control center.

Figure 2:
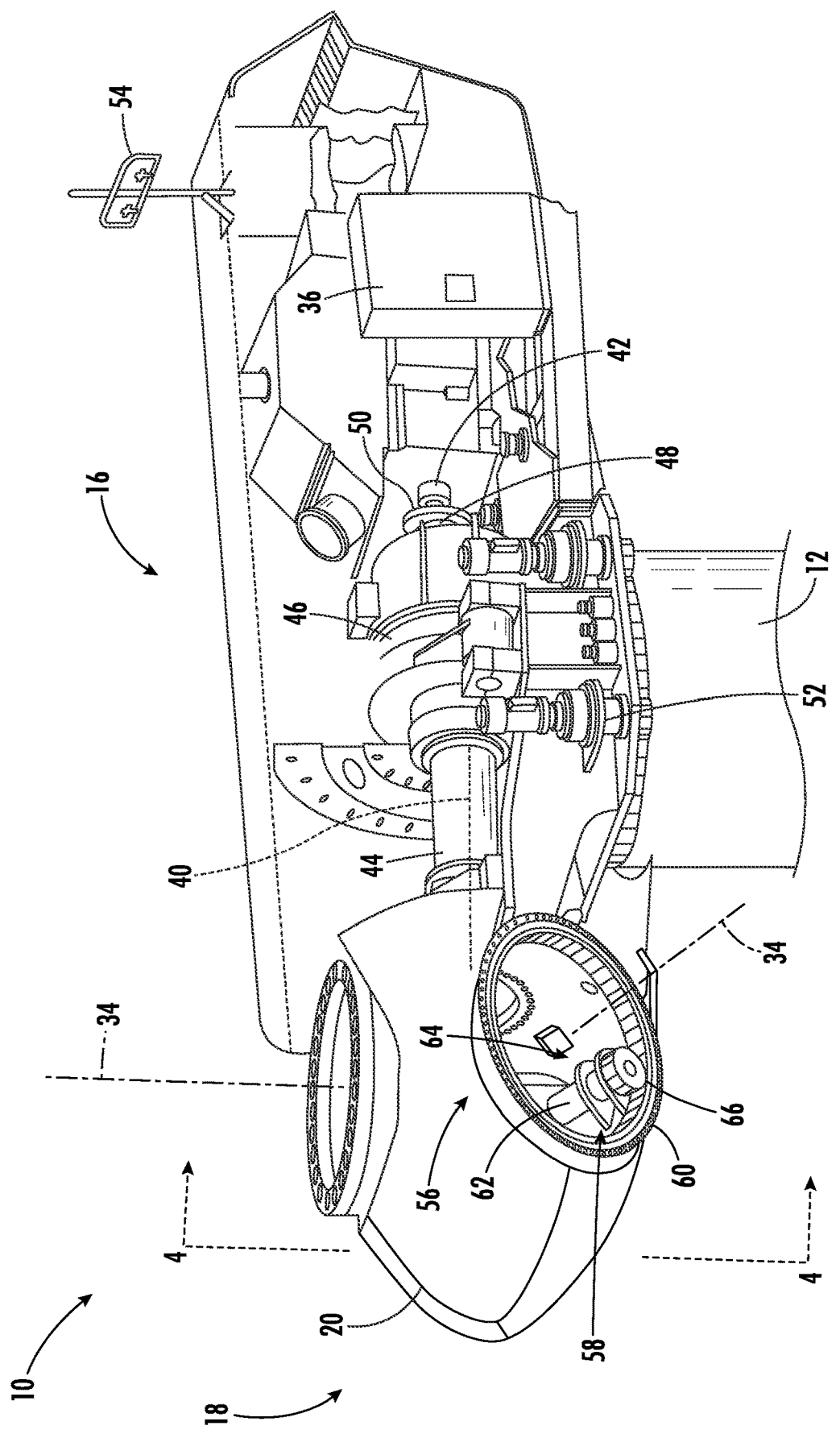
FIG. 2 illustrates an internal, perspective view of an embodiment of a nacelle of a wind turbine according to the present disclosure.

Referring now to FIG. 2, an enlarged sectional view of a portion of wind turbine 10, such as the nacelle 16, is illustrated. More specifically, as shown, the hub 20 is rotatably coupled to an electric generator 42 positioned within the nacelle 16 by a rotor shaft 44 (sometimes referred to as either a main shaft or a low speed shaft), a gearbox 46, a high speed shaft 48, and a coupling 50. In an embodiment, the rotor shaft 44 is disposed coaxial to longitudinal axis 40. Rotation of the rotor shaft 44 rotatably drives the gearbox 46 that subsequently drives the high speed shaft 48. The high speed shaft 48 rotatably drives the generator 42 with the coupling 50 and rotation of the high speed shaft 48 facilitates production of electrical power by the generator 42. In an embodiment, the gearbox 46 utilizes a dual path geometry to drive high speed shaft 48. Alternatively, the rotor shaft 44 is coupled directly to generator 42 with coupling 50.

The nacelle 16 also includes a yaw drive mechanism 52 that may be used to rotate the nacelle 16 and the hub 20 on the yaw axis 38 (shown in FIG. 1) to control the perspective of the rotor blades 22 with respect to the direction 28 of the wind. The nacelle 16 may also include at least one meteorological mast 54 that includes a wind vane and anemometer (neither shown in FIG. 2). The mast 54 provides information to controller 36 that may include wind direction and/or wind speed.

In an embodiment, the hub 20 further includes a pitch assembly 56. The pitch assembly 56 includes one or more pitch drive systems 58 coupled to a respective rotor blade 22 (shown in FIG. 1) for modulating the blade pitch of associated rotor blade 22 along pitch axis 34. Only one of three pitch drive systems 58 is shown in FIG. 2.

In an embodiment, the pitch assembly 56 includes at least one pitch bearing 60 coupled to the hub 20 and to the respective rotor blade 22 (shown in FIG. 1) for rotating the respective rotor blade 22 about the pitch axis 34. The pitch drive system 58 includes a pitch drive motor 62, a pitch drive gearbox 64, and a pitch drive pinion 66. The pitch drive motor 62 is coupled to pitch drive gearbox 64 such that pitch drive motor 62 imparts mechanical force to pitch drive gearbox 64. The pitch drive gearbox 64 is coupled to pitch drive pinion 66 such that pitch drive pinion 66 is rotated by pitch drive gearbox 64. The pitch bearing 60 is coupled to pitch drive pinion 66 such that the rotation of pitch drive pinion 66 causes rotation of pitch bearing 60. More specifically, in an embodiment, the pitch drive pinion 66 is coupled to pitch bearing 60 such that rotation of the pitch drive gearbox 64 rotates the pitch bearing 60 and the rotor blade 22 about the pitch axis 34 to change the blade pitch of the rotor blade 22. Further, in an embodiment, the pitch drive system 58 is coupled to the controller 36 for adjusting the blade pitch of rotor blade 22 upon receipt of one or more signals from controller 36.

Figure 3:
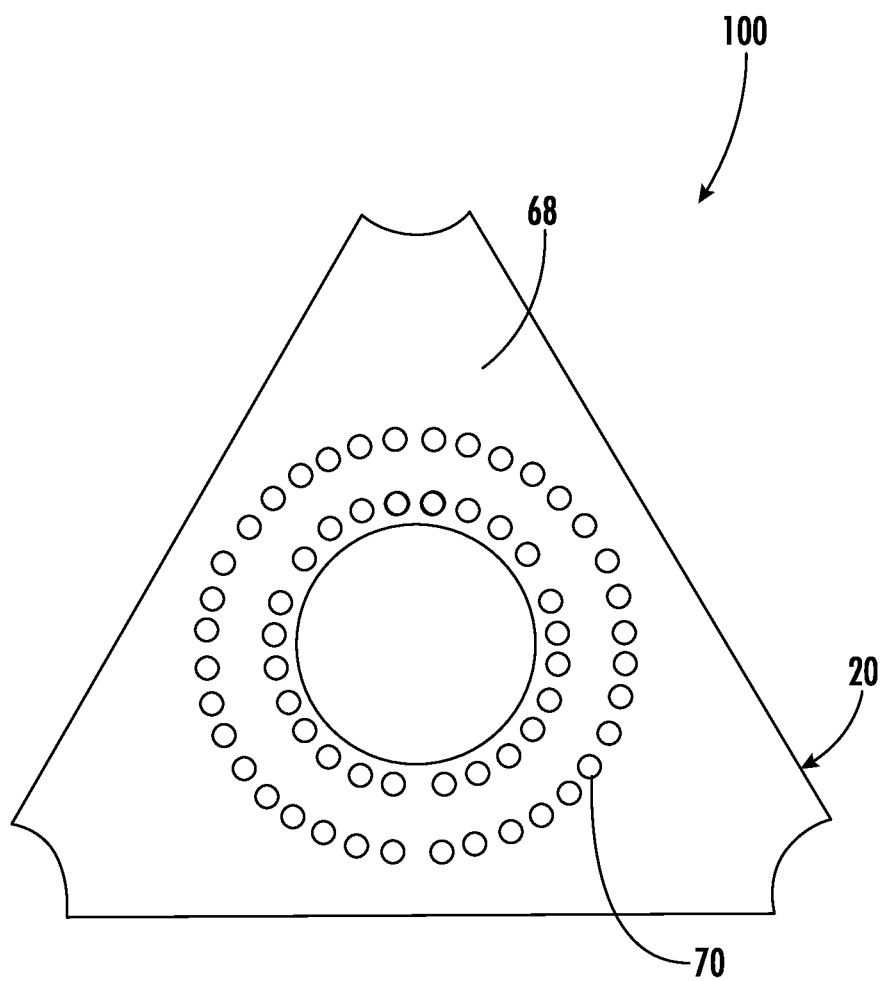
FIG. 3 illustrates a simplified front view of an embodiment of a hub of a wind turbine according to the present disclosure.
Figure 4:
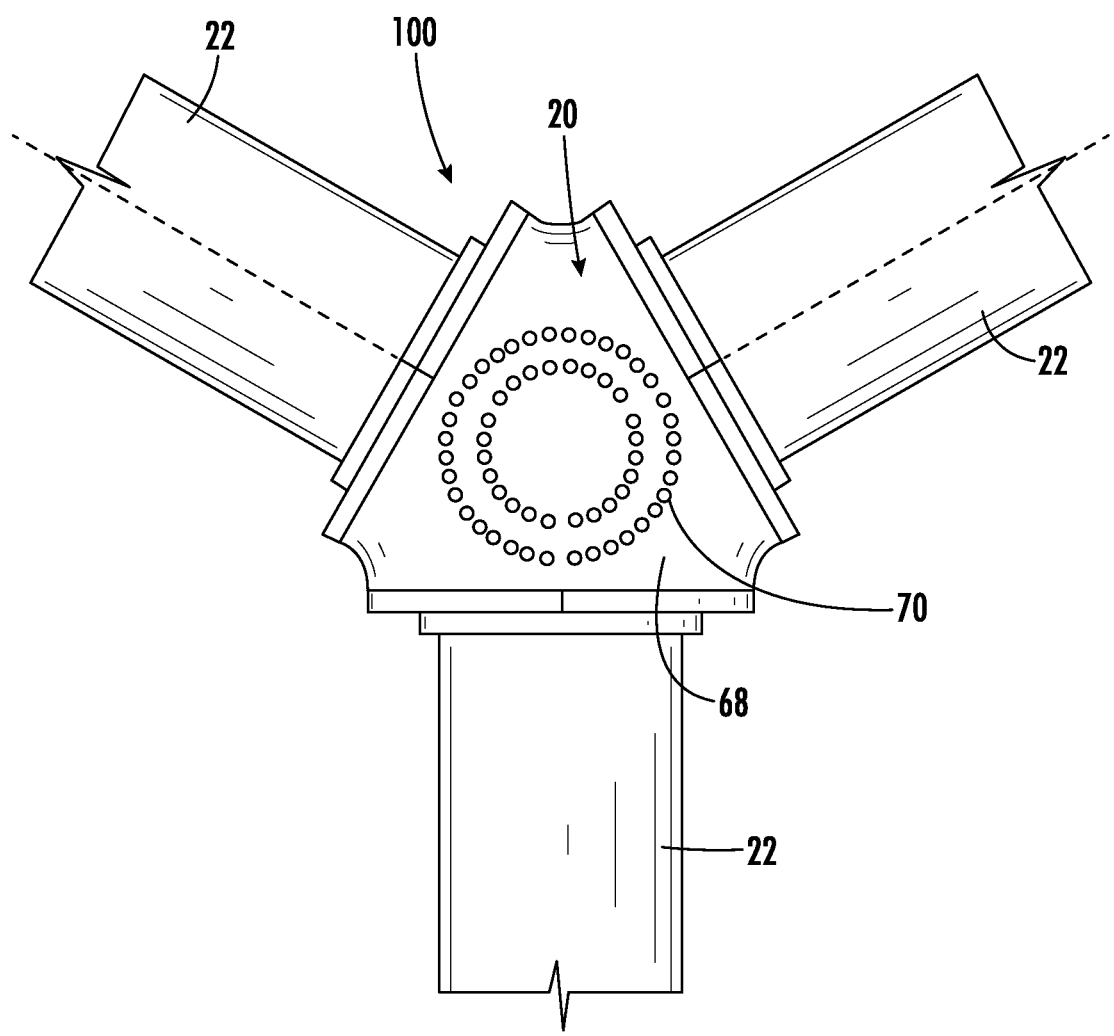
FIG. 4 illustrates a simplified front view of an embodiment of a hub of a wind turbine according to the present disclosure, particularly illustrating rotor blades mounted thereto.
Figure 5:
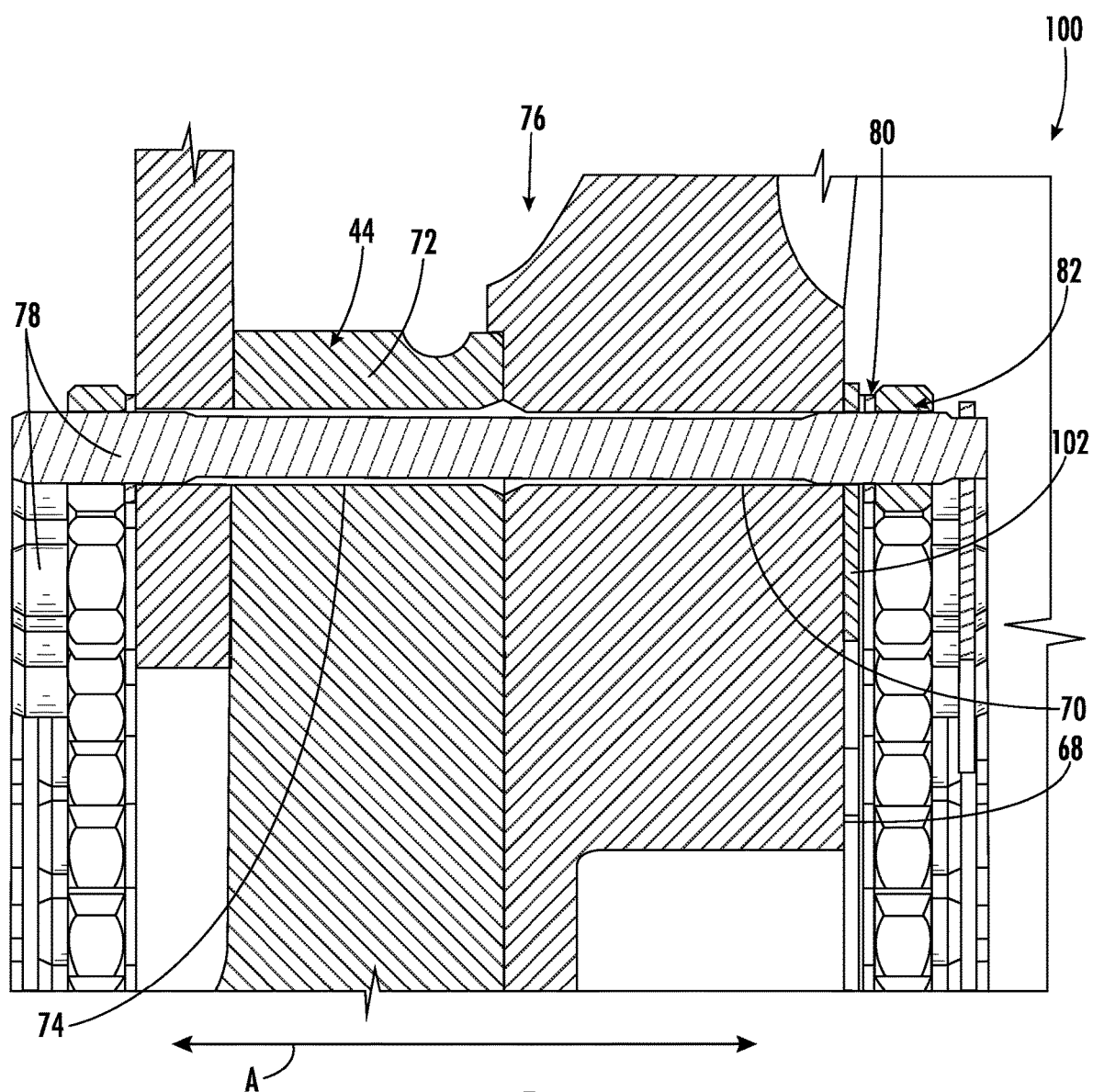
FIG. 5 illustrates an embodiment of a cross-sectional view of a hub assembly according to the present disclosure.

Referring now to FIGS. 3-5, various view of a hub assembly 100 including the hub 20 are provided. In particular, FIG. 3 illustrates a simplified front view of an embodiment of the hub 20 of the wind turbine 10 according to the present disclosure is illustrated. FIG. 4 illustrates an embodiment of the hub 20 having the rotor blades 22 mounted thereto.

As shown in FIGS. 3 and 4, the hub 20 includes a surface 68 having a first set of bolt holes 70 for mounting the hub 20 to the rotor shaft 44 (FIGS. 2 and 5). In particular, as shown, the first set of bolt holes 70 may be arranged such that the assembled hub 20 features at least two redundant, concentric, substantially circular arrangements of the first set of bolt holes 70 on its front face. The first set of bolt holes 70 are typically, but not necessarily coplanar. "Substantially circular arrangement" means that the first set of bolt holes 70 are arranged such that their specific bolt pattern relative to the rotational axis of the hub 20 (or, in another respect, relative to the rotational axis of the blade) defines a closed arrangement curve over 360° angle within a plane. It should also be understood that any suitable arrangement of the first set of bolt holes 70 may be employed on the hub 20 having any suitable matter.

Referring now to FIGS. 5-7, the hub assembly 100 also includes the rotor shaft 44 having a flange 72 with a second set of bolt holes 74. FIG. 5 illustrates an embodiment of a cross-sectional view of the hub assembly 100 in accordance with the present disclosure. FIG. 6 illustrates an embodiment of a front view of the hub assembly 100 in accordance with the present disclosure, particularly illustrating the hub-shaft interface 76 as viewed from outside of the hub 20. FIG. 7 illustrates a detailed, partial view of the hub assembly 100 of FIG. 6. Thus, as shown particularly in FIG. 5, the first set of bolt holes 70 is aligned, e.g., in an axial direction A, with the second set of bolt holes 74 at a hub-shaft interface 76. Moreover, as shown in FIGS. 5-7, the first set of bolt holes 70 are arranged in a first pattern on the surface 68 of the hub 20 and the second set of bolt holes 74 are arranged in a second pattern on the flange 72 of the rotor shaft 44 such that the first and second patterns are aligned with each other.

Accordingly, as shown in FIGS. 5-7, the hub assembly 100 includes a plurality of hub bolts 78 extending through the aligned first and second sets of bolt holes 70, 74 at the hub-shaft interface 76. Furthermore, as shown particularly in FIG. 5, the hub assembly 100 includes a plurality of washers 80 with one of the plurality of washers 80 extending around each of the plurality of hub bolts 78. In still further embodiments, as shown generally in FIGS. 5-7, the hub assembly 100 may also include a plurality of nuts 82 arranged with the plurality of hub bolts adjacent to the plurality of washers 80.

In addition, as shown particularly in FIGS. 5-7, the hub assembly 100 includes at least one spacer 102 positioned between the surface 68 of the hub 20 and a subset of the plurality of washers 80. Thus, as generally shown, at least two of the plurality of hub bolts 78 extend through the spacer(s) 102. By providing the spacer(s) 102 than span at least two or more hub bolts 78, nut rotation can be reduced. Such spacer(s) 102 can also be easy to handle and/or assemble. Moreover, in an embodiment, by adding the spacer(s) 102 in this manner, the contact pressure on the hub 20 can be reduced, e.g., from about 790 MPa to 459 MPa, which is less than an allowable pressure of 600 MPa for the hub 20 and thus hub embedment can also be reduced. Further, in an embodiment, the maximum pressure of 790 MPa under the washer(s) 80 is less than the allowable pressure of 1300 MPa for the spacer(s) 102. Furthermore, in an embodiment, one or more of the plurality of washers 80 may be a serrated lock washer, a smooth washer, a J washer, or any other type of washer or combinations thereof. Thus, in such embodiments, the spacer(s) 102 described herein can also eliminate or reduce stress concentration due to washer serration marks.

Referring particularly to FIGS. 6 and 7, in an embodiment, the hub assembly 100 may include a plurality of spacers 102 arranged circumferentially around the hub-shaft interface 76. In particular embodiments, as shown, the plurality of spacers 102 may include at least ten (10) spacers, with each of the plurality of spacers 102 receiving twelve (12) of the plurality of hub bolts 78 therethrough. In further embodiments, it should be understood that any number of spacers 102 and hub bolts 78 may be employed in the hub assembly 100, including more than twelve spacers or less than twelve spacers, as well as more than ten hub bolts or less than ten hub bolts per spacer.

The spacer(s) 102 described herein may be constructed of any suitable material, e.g., so as to minimize or eliminate washer embedment. Thus, in an embodiment, the spacer(s) 102 have a hardness greater than an hardness of the hub 20. In particular embodiments, for example, the spacer(s) 102 may be constructed of a steel material, such as 42CrMo4. Moreover, in an embodiment, the spacer(s) 102 may have a hardness of at least about 300 Vickers hardness number (VHN) and less than about 350 VHN. In further embodiments, the spacer(s) 102 may have a hardness of less than 300 VHN or greater than 350 VHN.

Figure 8:
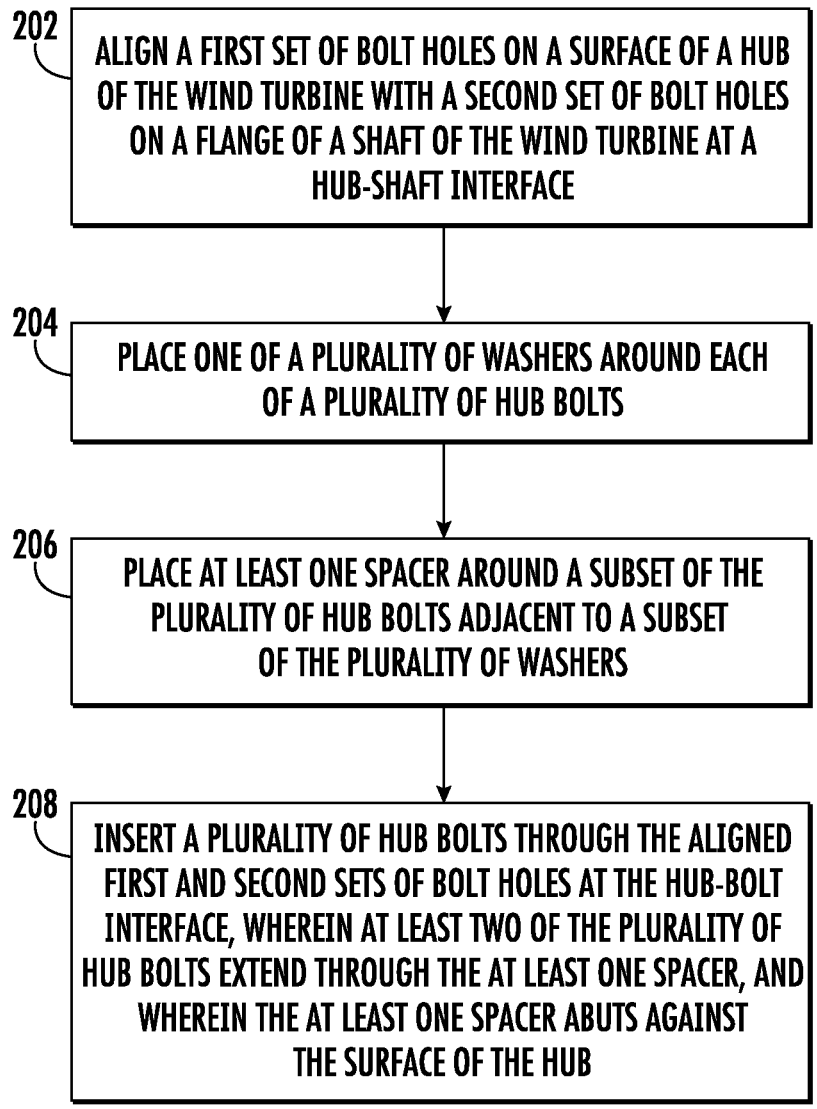
FIG. 8 illustrates a flow diagram of one embodiment of a method of assembling a hub assembly of a wind turbine according to the present disclosure.

Referring now to FIG. 8, a flow diagram of a method 200 of assembling a hub assembly of a wind turbine in accordance with the present disclosure is illustrated. In general, the method 200 will be described herein with reference to the hub assembly 100 described herein. However, it should be appreciated that the disclosed method 200 may be implemented with any suitable hub assembly having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes aligning a first set of bolt holes on a surface of a hub of the wind turbine with a second set of bolt holes on a flange of a shaft of the wind turbine at a hub-shaft interface. As shown at (204), the method 200 includes placing one of a plurality of washers around each of a plurality of hub bolts. As shown at (206), the method 200 includes placing at least one spacer around a subset of the plurality of hub bolts adjacent to a subset of the plurality of washers. As shown at (208), the method 200 includes inserting a plurality of hub bolts through the aligned first and second sets of bolt holes at the hub-shaft interface, wherein at least two of the plurality of hub bolts extends through the at least one spacer, and wherein the at least one spacer abuts against the surface of the hub.

Further aspects of the present disclosure are provided by the subject matter of the following clauses:

A hub assembly for a wind turbine, the hub assembly comprising: a hub comprising a surface defining a first set of bolt holes; a shaft comprising a flange having a second set of bolt holes, the first set of bolt holes aligning with the second set of bolt holes at a hub-shaft interface; a plurality of hub bolts extending through the first and second sets of bolt holes at the hub-shaft interface; a plurality of washers with one of the plurality of washers extending around each of the plurality of hub bolts; at least one spacer positioned between the surface of the hub and a subset of the plurality of washers, wherein at least two of the plurality of hub bolts extends through the at least one spacer.

The hub assembly of any preceding clause, further comprising a plurality of spacers, the at least one spacer being one of the plurality of spacers, wherein the plurality of spacers is arranged circumferentially around the hub-shaft interface.

The hub assembly of any preceding clause, wherein the plurality of spacers comprises at least ten (10) spacers, with each of the plurality of spacers receiving twelve (12) of the plurality of hub bolts therethrough.

The hub assembly of any preceding clause, wherein the first set of bolt holes are arranged in a first pattern on the surface of the hub and the second set of bolt holes are arranged in a second pattern on the flange of the shaft, the first and second patterns being aligned with each other.

The hub assembly of any preceding clause, wherein the at least one spacer is constructed of a steel material.

The hub assembly of any preceding clause, wherein the at least one spacer has a hardness of at least about 300 Vickers hardness number (VHN).

The hub assembly of any preceding clause, wherein the at least one spacer has a hardness of less than about 350 Vickers hardness number (VHN).

The hub assembly of any preceding clause, wherein one or more of the plurality of washers is one or more of a serrated lock washer, a smooth washer, or a J washer, the hub assembly further comprising a plurality of nuts arranged with the plurality of hub bolts adjacent to the plurality of washers.

The hub assembly of any preceding clause, wherein the shaft is a rotor shaft of the wind turbine.

A method of assembling a hub assembly of a wind turbine, the method comprising: aligning a first set of bolt holes on a surface of a hub of the wind turbine with a second set of bolt holes on a flange of a shaft of the wind turbine at a hub-shaft interface; placing one of a plurality of washers around each of a plurality of hub bolts; placing at least one spacer around a subset of the plurality of hub bolts adjacent to a subset of the plurality of washers; and inserting a plurality of hub bolts through the aligned first and second sets of bolt holes at the hub-shaft interface, wherein at least two of the plurality of hub bolts extend through the at least one spacer, and wherein the at least one spacer abuts against the surface of the hub.

The method of any preceding clause, wherein the at least one spacer is one of a plurality of spacers, the method further comprising arranging the plurality of spacers circumferentially around the hub-shaft interface.

The method of any preceding clause, further comprising arranging a plurality of nuts with the plurality of hub bolts adjacent to the plurality of washers.

The method of any preceding clause, wherein the first set of bolt holes are arranged in a first pattern on the surface of the hub and the second set of bolt holes are arranged in a second pattern on the flange of the shaft.

The method of any preceding clause, further comprising constructing the at least one spacer of a steel material.

The method of any preceding clause, wherein the at least one spacer has a hardness of at least about 300 Vickers hardness number (VHN) and less than about 350 VHN.

The method of any preceding clause, wherein one or more of the plurality of washers is one or more of a serrated lock washer, a smooth washer, or a J washer.

The method of any preceding clause, wherein the shaft is a rotor shaft.

A wind turbine, comprising: a tower; a nacelle mounted atop the tower; a rotor mounted to the nacelle, the rotor comprising a hub assembly having at least one rotor blade mounted thereto, the hub assembly comprising: a hub comprising a surface defining a first set of bolt holes; a rotor shaft comprising a flange having a second set of bolt holes, the first set of bolt holes aligning with the second set of bolt holes at a hub-shaft interface; a plurality of hub bolts extending through the first and second sets of bolt holes at the hub-shaft interface; a plurality of washers with one of the plurality of washers extending around each of the plurality of hub bolts; at least one spacer positioned between the surface of the hub and a subset of the plurality of washers, wherein at least two of the plurality of hub bolts extends through the at least one spacer.

The wind turbine of any preceding clause, further comprising a plurality of spacers, the at least one spacer being one of the plurality of spacers, wherein the plurality of spacers is arranged circumferentially around the hub-shaft interface.

The wind turbine of any preceding clause, wherein the at least one spacer is constructed of a steel material, the steel material having a hardness of at least about 300 Vickers hardness number (VHN) less than about 350 VHN.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hub assembly for a wind turbine, the hub assembly comprising:
   a hub comprising a surface defining a first set of bolt holes;
   a shaft comprising a flange having a second set of bolt holes, the first set of bolt holes aligning with the second set of bolt holes at a hub-shaft interface;

a plurality of hub bolts extending through the first and second sets of bolt holes at the hub-shaft interface;

a plurality of washers with one of the plurality of washers extending around each of the plurality of hub bolts;

at least one spacer positioned between the surface of the hub and a subset of the plurality of washers, wherein at least two of the plurality of hub bolts extends through the at least one spacer.

2. The hub assembly of claim 1, further comprising a plurality of spacers, the at least one spacer being one of the plurality of spacers, wherein the plurality of spacers is arranged circumferentially around the hub-shaft interface.

3. The hub assembly of claim 2, wherein the plurality of spacers comprises at least ten (10) spacers, with each of the plurality of spacers receiving twelve (12) of the plurality of hub bolts therethrough.

4. The hub assembly of claim 1, wherein the first set of bolt holes are arranged in a first pattern on the surface of the hub and the second set of bolt holes are arranged in a second pattern on the flange of the shaft, the first and second patterns being aligned with each other.

5. The hub assembly of claim 1, wherein the at least one spacer is constructed of a steel material.

6. The hub assembly of claim 1, wherein the at least one spacer has a hardness of at least 300 Vickers hardness number (VHN).

7. The hub assembly of claim 1, wherein the at least one spacer has a hardness of less than 350 Vickers hardness number (VHN).

8. The hub assembly of claim 1, wherein one or more of the plurality of washers is one or more of a serrated lock washer, a smooth washer, or a J washer, the hub assembly further comprising a plurality of nuts arranged with the plurality of hub bolts adjacent to the plurality of washers.

9. The hub assembly of claim 1, wherein the shaft is a rotor shaft of the wind turbine.

10. A method of assembling a hub assembly of a wind turbine, the method comprising:

aligning a first set of bolt holes on a surface of a hub of the wind turbine with a second set of bolt holes on a flange of a shaft of the wind turbine at a hub-shaft interface;

placing one of a plurality of washers around each of a plurality of hub bolts;

placing at least one spacer around a subset of the plurality of hub bolts adjacent to a subset of the plurality of washers; and inserting a plurality of hub bolts through the aligned first and second sets of bolt holes at the hub-shaft interface, wherein at least two of the plurality of hub bolts extend through the at least one spacer, and wherein the at least one spacer abuts against the surface of the hub.

11. The method of claim 10, wherein the at least one spacer is one of a plurality of spacers, the method further comprising arranging the plurality of spacers circumferentially around the hub-shaft interface.

12. The method of claim 10, further comprising arranging a plurality of nuts with the plurality of hub bolts adjacent to the plurality of washers.

13. The method of claim 10, wherein the first set of bolt holes are arranged in a first pattern on the surface of the hub and the second set of bolt holes are arranged in a second pattern on the flange of the shaft.

14. The method of claim 10, further comprising constructing the at least one spacer of a steel material.

15. The method of claim 10, wherein the at least one spacer has a hardness of at least 300 Vickers hardness number (VHN) and less than 350 VHN.

16. The method of claim 10, wherein one or more of the plurality of washers is one or more of a serrated lock washer, a smooth washer, or a J washer.

17. The method of claim 10, wherein the shaft is a rotor shaft.

18. A wind turbine, comprising:

a tower;

a nacelle mounted atop the tower;

a rotor mounted to the nacelle, the rotor comprising a hub assembly having at least one rotor blade mounted thereto, the hub assembly comprising:

a hub comprising a surface defining a first set of bolt holes;

a rotor shaft comprising a flange having a second set of bolt holes, the first set of bolt holes aligning with the second set of bolt holes at a hub-shaft interface;

a plurality of hub bolts extending through the first and second sets of bolt holes at the hub-shaft interface;

a plurality of washers with one of the plurality of washers extending around each of the plurality of hub bolts;

at least one spacer positioned between the surface of the hub and a subset of the plurality of washers, wherein at least two of the plurality of hub bolts extends through the at least one spacer.

19. The wind turbine of claim 18, further comprising a plurality of spacers, the at least one spacer being one of the plurality of spacers, wherein the plurality of spacers is arranged circumferentially around the hub-shaft interface.

20. The wind turbine of claim 18, wherein the at least one spacer is constructed of a steel material, the steel material having a hardness of at least 300 Vickers hardness number (VHN) and less than 350 VHN.

* * * * *